United States Patent
Brück

(10) Patent No.: US 10,746,070 B2
(45) Date of Patent: Aug. 18, 2020

(54) TANK SYSTEM FOR A REDUCING AGENT

(71) Applicant: Continental Automotive GmbH, Hannover (DE)

(72) Inventor: Rolf Brück, Bergisch Gladbach (DE)

(73) Assignee: Continental Automotive GmbH, Hannover (DE)

( * ) Notice: Subject to any disclaimer, the term of this patent is extended or adjusted under 35 U.S.C. 154(b) by 69 days.

(21) Appl. No.: 16/060,908

(22) PCT Filed: Dec. 7, 2016

(86) PCT No.: PCT/EP2016/080019
§ 371 (c)(1),
(2) Date: Jun. 8, 2018

(87) PCT Pub. No.: WO2017/097810
PCT Pub. Date: Jun. 15, 2017

(65) Prior Publication Data
US 2018/0363531 A1    Dec. 20, 2018

(30) Foreign Application Priority Data

Dec. 10, 2015 (DE) .......... 10 2015 224 923

(51) Int. Cl.
*F01N 3/20* (2006.01)
*B60K 13/04* (2006.01)

(52) U.S. Cl.
CPC .......... *F01N 3/2066* (2013.01); *B60K 13/04* (2013.01); *F01N 2610/02* (2013.01);
(Continued)

(58) Field of Classification Search
CPC .......... F01N 3/2066; F01N 2610/02; F01N 2610/1406; F01N 2610/1433; F01N 2610/1486; B60K 13/04
(Continued)

(56) References Cited

U.S. PATENT DOCUMENTS

2015/0210159 A1* 7/2015 Maguin ............. F01N 3/2066
60/295
2015/0285120 A1 10/2015 Hodgson et al.

FOREIGN PATENT DOCUMENTS

CN         103237966        8/2013
DE    10 2010 029 594 A1   12/2011
(Continued)

OTHER PUBLICATIONS

Search Report and Written Opinion dated Feb. 6, 2017 which issued in the corresponding International Patent Application No. PCT/EP2016/080019.

(Continued)

*Primary Examiner* — Elizabeth J Volz
(74) *Attorney, Agent, or Firm* — Cozen O'Connor

(57) ABSTRACT

A tank system for a reducing agent includes: a vessel storing the reducing agent and having: an upper vessel wall, lateral vessel walls, a lower vessel wall forming a base of the vessel, a base region of the vessel having at least one opening, and an outer side of the vessel; and a conveying device, arranged on the outer side of the vessel, that provides the reducing agent under pressure to exhaust gas. The conveying device is disposed on the outer side of the vessel such that the conveying device, with the outer side of the vessel, forms a space S outside the vessel. The space S, by the at least one opening, is connected to the vessel interior allowing the reducing agent to flow from the interior of the vessel into the space S and is suppliable by the conveying device from the space S to the exhaust gas.

15 Claims, 4 Drawing Sheets

(52) U.S. Cl.
CPC .............. *F01N 2610/1406* (2013.01); *F01N 2610/1433* (2013.01); *F01N 2610/1486* (2013.01); *Y02T 10/24* (2013.01)

(58) Field of Classification Search
USPC ................ 220/4.12, 562, 564, 694; 60/301
See application file for complete search history.

(56) References Cited

FOREIGN PATENT DOCUMENTS

| | | |
|---|---|---|
| DE | 10 2011 006 105 A1 | 9/2012 |
| DE | 10 2012 219 038 A1 | 4/2014 |
| DE | 2012 110 760 A1 | 5/2014 |
| EP | 2 336 515 A2 | 6/2011 |
| KR | 101331687 B1 | 11/2013 |
| WO | WO 2015/036290 A1 | 3/2015 |

OTHER PUBLICATIONS

Office Action dated Sep. 18, 2019 issued in India Patent Application No. 201837017050.

\* cited by examiner

TANK SYSTEM FOR A REDUCING AGENT

CROSS-REFERENCE TO RELATED APPLICATIONS

This is a U.S. national stage of application No. PCT/EP2016/080019 filed on 7 Dec. 2016, which claims priority to the Germany Application No. 10 2015 224 923.9 filed 10 Dec. 2015, the content of both incorporated herein by reference.

BACKGROUND OF THE INVENTION

1. Field of the Invention

The invention relates to a tank system for a reducing agent.

2. Related Art

It is known for reducing agents to be added to the exhaust gases of motor vehicles to reduce undesirable component parts, in particular nitrogen oxide compounds, of the exhaust gas, in that the nitrogen oxide compounds are converted to other compounds such as nitrogen, water, and carbon dioxide. A urea solution, which is also available under the AdBlue trademark, is used herein as the reducing agent. A vessel for the provision and storage of the urea solution is provided in motor vehicles. This vessel is connected to a conveying device. The conveying device is composed of a pump, that suctions the reducing agent and dispenses the reducing agent under pressure into a conveying line. The urea solution, by way of the conveying line, makes its way to an injection device which injects the urea solution into an exhaust gas line and into the exhaust gas flowing therein. The conveying device has further components such as filling level transducers, sensors, filters, and heating devices, which are provided for the safe and reliable operation of the tank system.

It is furthermore known for an opening to be incorporated in the vessel for the conveying device to be disposed in the interior of the vessel. The opening in the vessel is closable by a flange. The urea solution conveyed by the conveying device is guided out of the vessel and to the exhaust gas line by way of an outlet integrated in the flange. It is disadvantageous that complete emptying of the vessel is not possible in the case of the conveying device being disposed through an opening in the base of the vessel. Even when the conveying device is able to empty the vessel down to a filling level of a few millimeters in the vessel, by virtue of the base area a significant residual volume that is not conveyable remains in the vessel.

SUMMARY OF THE INVENTION

It is therefore an object of the present invention to achieve a tank system by way of which almost complete emptying of the vessel is possible. Such a tank system enables the vessel to be emptied, using little complexity.

According to one aspect of the invention, this object can be achieved according to the invention by a tank system for a reducing agent, the tank system including a vessel for the reducing agent, having an upper vessel wall, lateral vessel walls, and a lower vessel wall, and comprising a conveying device in order for the reducing agent to be suctioned and to foe provided so as to be suppliable under pressure by way of an outlet to an exhaust gas. At least one opening is provided in the base region of the vessel, the conveying device being disposed on the outer side of the vessel such that the conveying device conjointly with the outer side of the vessel forms a space S, wherein the space S, by way of the at least one opening, is connected to the interior of the vessel such that reducing agent located in the vessel can make its way from the interior of the vessel into the space S located outside the vessel, and by way of the conveying device, is suppliable from the space S to the exhaust gas.

By way of the arrangement of the conveying device on the outer side of the vessel, the conveying device conjointly with the outer aide forms a space S. The space S, by way of the at least one opening in the vessel wall is connected to the interior of the vessel, wherein the opening is disposed in the region of the vessel base where the outer side of the vessel and the conveying device form the space S. The opening enables the inflow of the reducing agent into the space S where the reducing agent is suctioned by the conveying device and conveyed to the exhaust gas line of the motor vehicle. The arrangement of the conveying device outside the vessel permits a particularly low suction point such that the vessel can be almost completely emptied. Vessels having a very large utilizable volume can thus be implemented by way of the tank system according to the invention.

In order for a simple connection of the conveying device to the outer side of the container to be guaranteed it has proven advantageous for the conveying device to have a flange surrounding the conveying device, and for the flange to be connected to the outer side of the vessel for forming the space S.

The connection of the conveying device to the outer side of the vessel is constructed in a particularly simple manner when the conveying device, in particular the flange thereof, is adhesively bonded or welded to the vessel. Additional sealing elements can be dispensed with in the case of such a liquid-tight connection. As a result, the tank system is constructed in a simpler and more cost-effective manner.

In another aspect, the connection of the conveying device to the vessel is configured as a bayonet connection. To this end, the flange has a metallic insert part brought to engage with a corresponding counterpart disposed in the vessel base. The advantage of this connection lies in that the conveying device, in particular for repair and/or maintenance, can be separated from the vessel without any additional effort and be subsequently again connected to the vessel in a liquid-tight manner.

In order for the accessibility to all or some components to be guaranteed even in the case of a filled vessel, it has proven advantageous for the conveying device to comprise a housing in which the components are disposed. For this purpose, the housing is provided with a lid or a cover. The accessibility is thus independent of the filling level in the vessel; dismantling the vessel is also not required.

In one advantageous aspect, 2 to 20 openings, preferably 2 to 10 openings, in particular 2 to 4 openings, are disposed in the region of the vessel, which conjointly with the conveying device forms the space S. The advantage lies in that the number of openings can be adapted in an optimal manner, depending on the tank system and on the parameters. The provision of few openings is relevant in particular when the complexity for the production of the vessel is to be minimized. By contrast, the disposal of a plurality of openings guarantees a reliable passage of the reducing agent from the vessel into the space S under all possible operating conditions, in particular the driving behavior. While the majority of the openings in the case of a few openings is disposed in direct proximity of the base, some of the openings in the case of a comparatively large number of openings can be disposed at a larger spacing from the base of the vessel.

An almost complete emptying of the vessel is enabled by the disposal in direct proximity of the base. In as far as a plurality of openings are present, it is additionally ensured, that a reliable overflow from the vessel into the space S is guaranteed even when one opening fails, for example clogs up.

In one particularly simple aspect, all openings are of an identical size. The enables a particularly simple design of the tools for the production of the vessel.

In another advantageous aspect, at least one opening is larger than at least one other opening. The provision of at least one larger opening has the advantage that the vessel can be adapted to special requirements of the tank system and/or of the conveying device in this way. This is advantageous in particular in the case of a filling lever sensor that is integrated in the conveying device, since disturbing influences in the determination of the filling level, for example in the sound dissemination of an ultrasonic sensor, are prevented or at least minimized by way of the larger opening to the extent that the disturbing influences do not influence the measurement result. Thus the of a sound-carrying tube can be dispensed with.

The adaptation of the openings in terms of sound carrying can be avoided, according to a further aspect in that another sensor, for example a capacitive sensor or a reed contact sensor, is provided as a filling level sensor. Sensors of this type have the advantage that they extend across almost the entire height of the vessel and herein have only a minor diameter. Sensors of this type can thus be readily integrated in the conveying device in the space S, from where the sensors extend through an opening in the tank base into the interior of the vessel. The opening herein would not have to be separately configured.

With a view to a simple production, the openings are circular. However, it is likewise conceivable for at least one of the openings to have a construction that deviates from the circular shape. The opening can be adapted to a part of the conveying device such that this part protrudes from the space S through the opening into the vessel, or is positioned in the space S such that the part is located below the opening. The openings can furthermore have a polygonal, preferably quadrangular, shape.

The object of the openings lies in allowing sufficient reducing agent to pass from the vessel into the space S located outside the vessel. In order for this to be guaranteed, the cross section of all openings has to be of a sufficient size. A measure for the cross-sectional area is the porosity of the region of the vessel that, conjointly with the conveying device, forms the space S. The porosity is a result of the proportion of the cross-sectional areas of all openings in relation to the total area of the vessel region. The porosity herein can be 98% to 2%, preferably 80% to 4%, and in particular 50% to 6%. The porosity is lower in the case of large areas of the vessel region, and higher in the case of comparatively small areas.

In another aspect, the region of the vessel, which conjointly with the conveying device forms the space S, has at least one inversion that is directed into the interior of the vessel. This has the advantage that the conveying device can plunge into said inversion, wherein the conveying device is, however, still disposed outside the vessel. By virtue of this arrangement, the conveying device can be completely disposed in the inversion. A tank system of this type therefore requires less installation space than a comparable vessel having a lower vessel wall without an inversion.

The inversions are adapted to the conveying device in a particularly advantageous manner in that the inversions in relation to the filling level have dissimilar heights.

In the simplest case, the openings are disposed in a manner distributed uniformly in the region of the vessel that conjointly with the conveying device forms the space S.

Depending on the functional part-units of the conveying device, it can be advantageous for the openings to be disposed in a manner distributed nonuniformly in the region of the vessel that conjointly with the conveying device forms the space S.

In a further advantageous aspect, regions of the conveying device within the space S bear on the outer side of the vessel, on account of which the volume of the space S is kept small. This is advantageous in particular when the reducing agent located in the space S is frozen, since the heating device required for thawing can be of a smaller dimension.

When at least the regions in which the conveying device within the space S bears on the outer side of the vessel are provided with a heating device, this has the advantage that heating the vessel wall is enabled on account thereof. This allows reducing agent located in the interior of the vessel to be thawed without a heating device additionally integrated in the vessel and utilized for the post-treatment of exhaust gas. The heating device herein can comprise one heating element or a plurality of heating elements.

BRIEF DESCRIPTION OF THE DRAWINGS

The invention will be explained in more detail by way of a plurality of exemplary embodiments. In the Figures.

DETAILED DESCRIPTION OF THE PRESENTLY PREFERRED EMBODIMENTS

Figure 1:
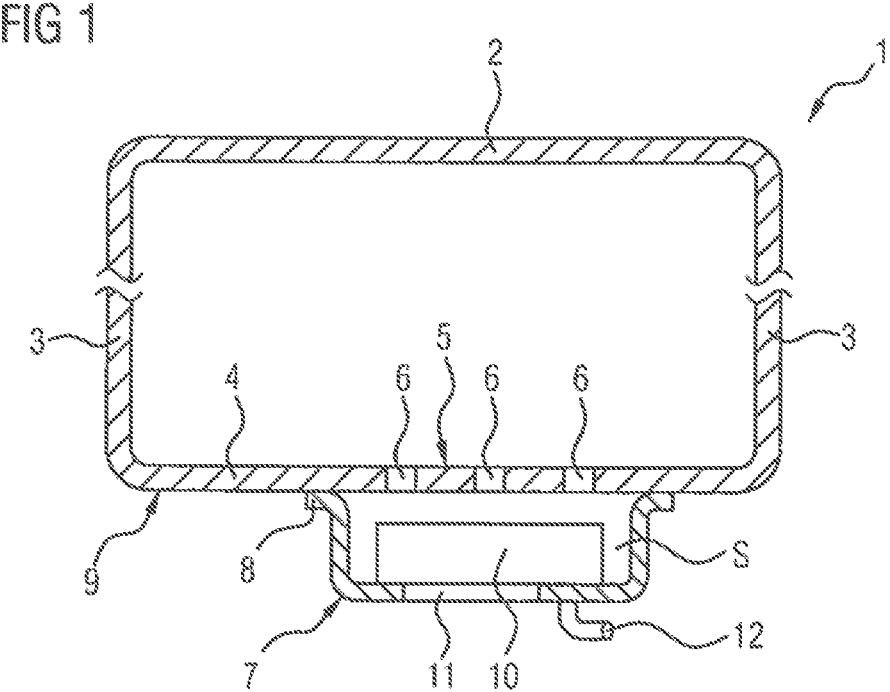
FIG. 1 shows a schematic illustration of the tank system according to the invention.

FIG. 1 shows a tank system having a vessel 1, which, in the installed position, has an upper vessel wall 2, a filling portion (not illustrated) for the reducing agent, lateral vessel walls 3, and a lower vessel wall 4. The lower vessel wall 4 forms the base of the vessel 1. The vessel 1 is composed of plastics. However, it is also conceivable for the vessel to be produced from metal. Openings 6 are disposed in a flat base region 5 of the lower vessel wall 4. A conveying device is located outside the vessel 1. The conveying device 7 has a flange 8, surrounding the conveying device 7, which is connected to the outer side 9 of the vessel 1. The conveying device 7, conjointly with the outer side 9 of the vessel 1, encloses a volume such that the conveying device 7 and the outer side 9 form a space S. The vessel 1 is thus not penetrated by the conveying device 7. The space S is connected to the interior of the vessel 1 by the openings 6 in the lower vessel wall 4. On account thereof, urea solution stored in the interior of the vessel can flow through the vessel wall 4 to the outside into the space S. The conveying device 7 has a housing 10 in or on which various components (not illustrated in more detail), for example a pump, pressure regulators, heating devices, filters, filling level and quality sensors, can be disposed. The housing 10 furthermore comprises a lid 11, which closes the housing 10. The urea solution located in the space S can be suctioned by the pump and by way of an outlet 12, be supplied under pressure into a conveying line of an exhaust gas line, the urea solution being admixed to the exhaust gas in the conveying line. The space S, by virtue of the exposed position of the conveying device 7 on the outer side of the vessel 1, is comparatively sensitive to temperature influences. The space S, in particular in the case of low temperatures, freezes prior to the adjacent volume in the interior of the vessel 1. The associated enlargement of the volume in the space S leads to the volume by virtue of the openings 6 being able to expand in the direction of the vessel 1, on account of which critical stresses in the space S, and thus in the conveying device, are avoided.

Figure 2:
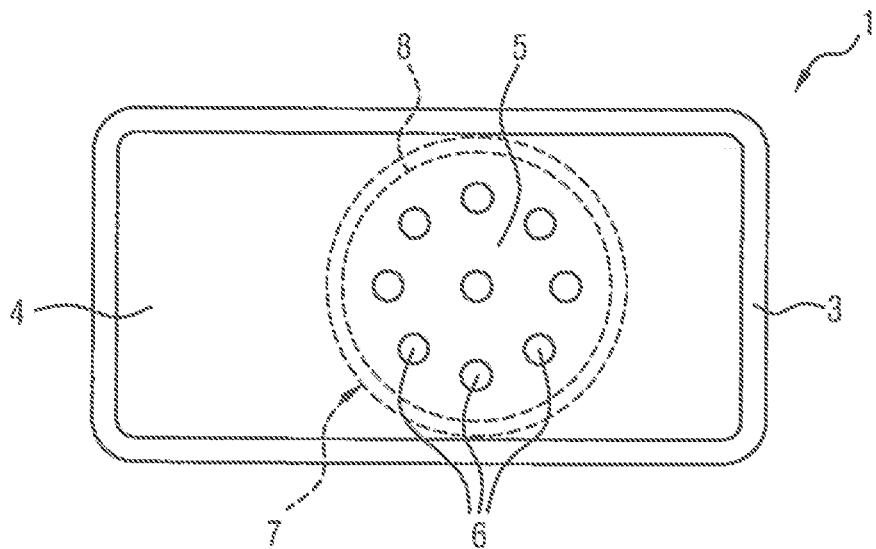
FIG. 2 shows a plan view of the base of the vessel as per FIG. 1.

FIG. 2 shows the interior of the vessel 1 by way of a plan view of the lower vessel wall 4. The base region 5 of the vessel 1 has a total of 10 openings 6 of identical size, by way of which the urea solution can flow from the interior of the vessel 1 into the space S lying therebelow. The base region has a porosity of approximately 10%. The base region S is delimited by the flange 8 of the conveying device 7, the flange 8 being illustrated by dashed lines.

Figure 3:
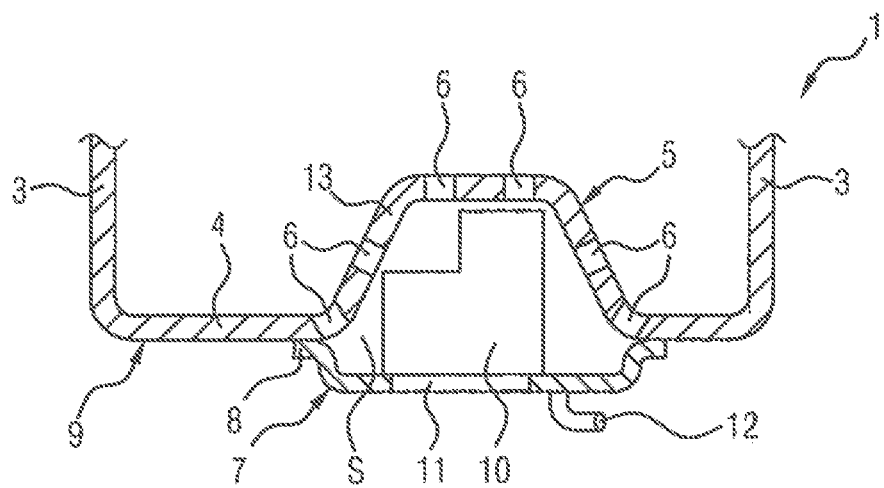
FIGS. 3, 5, 6 show further embodiments as per FIG. 1.

The vessel in FIG. 3 has a construction similar to that in FIG. 1. The base region 5 is configured as an inversion 13 that is directed into the interior of the vessel 1. By virtue of this inversion 13, the volume of the vessel 1 is smaller than in the case of the flat base region 5 as in FIG. 1. The conveying device 7 is disposed on the outer side 9 of the vessel 1 in the base region 5, the flange 8 of the conveying device being welded to the outer side 9 such that the conveying device 7 and the outer side 9 of the vessel 1 form the space S. The connection of the space S to the interior of the vessel is established by way of openings 6, which are disposed so as to be distributed across the inversion 13. By virtue of this distribution, the openings 6 are disposed at different spacings from the lower vessel wall 4. The housing 10, having the components disposed therein, extends in the direction of the vessel 1 and thus protrudes into the region that is excluded by the inversion 13. The tank system thus requires less installation space coward the bottom. The conveying device 7 herein is disposed as in FIG. 1, so as to continue to be completely outside the vessel 1. With a view to a simpler production of the vessel 1 as a result of an improved demolding capability, the inversion 13 is configured so as to be conical.

Figure 4:
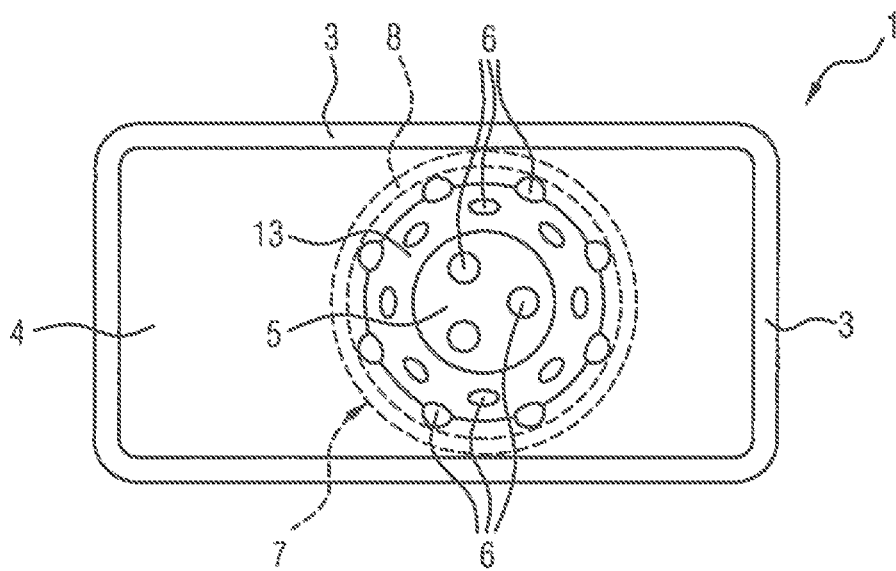
FIGS. 4, 7 show further embodiments as per FIG. 2.

The lower vessel wall 4 having the inversion 13 is shown in a plan view in FIG. 4. The inversion 13 has a series of openings 6, wherein more openings 6 are disposed near the vessel wall 4, and fewer openings are disposed in the center of the inversion 13. The radially outward openings 6, near the lower vessel wall 4, have a smaller cross-sectional area than the radially inward openings 6. An overflow of the urea solution into the space S is enabled from each incident flow direction on account of the many smaller openings, even in the case of an almost empty vessel. By contrast, when the space S freezes, the larger openings 6 enable an expansion of the freezing urea solution from the space S into the vessel 1, such that, in particular, stresses acting on the flange 8 are minimized. These stresses can also be minimized in that the base region 5 is disposed at a spacing from the lateral vessel walls 3. The regions of the lower vessel wall 4 lying between the base region 5 and the vessel wall 3 on account thereof have a certain mobility, which permits the former to be able to react to variations in the volume of the freezing urea solution.

Figure 5:
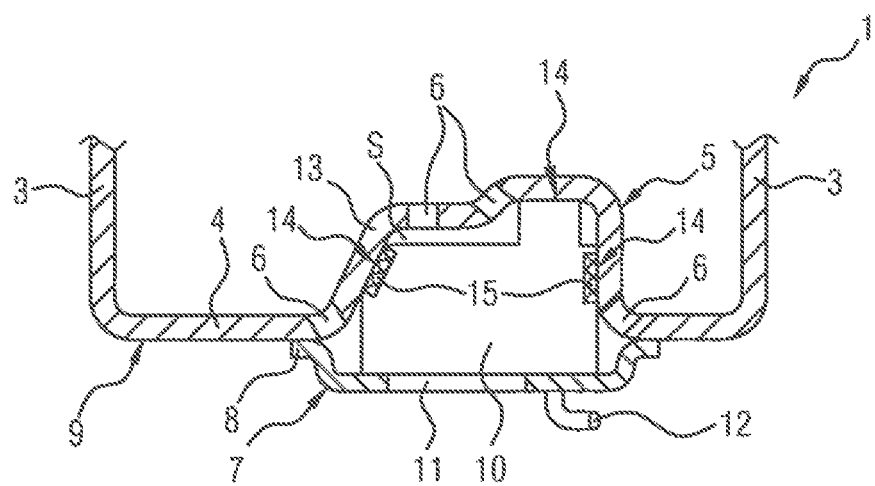

The tank system in FIG. 5 differs from that of FIG. 3 in that the inversion 13 has two different heights, and thus a plurality of heights, in relation to the lower vessel wall 4, in order for the vessel 1 to be adapted to the shape of the conveying device 7. On account thereof, the space S can be kept small. The inversion 13 and the conveying device 7 are furthermore mutually adapted in such a manner that regions 14 of the conveying device 7 within the space S hear on the outer side 9 of the vessel 1. Freezing of the urea solution located in the space S is prevented, or a frozen urea solution can be thawed, with the aid of a heating device 15 disposed in these regions. The lower vessel base 4 is also heated by virtue of the contact between the regions 14 and the base region 5, such that urea solution located in the interior of the vessel 1 is likewise protected. The contact between the regions 14 and the outer side 9 is independent of the presence of a heating device 15. A heating device 15 for heating the urea solution in the space S can likewise be provided, without the regions 14 being in contact with the outer side 9 of the vessel 1. The heating device 15 can moreover have one or a plurality of active heating elements and optionally a heat conducting structure for transmitting heat.

Figure 6:
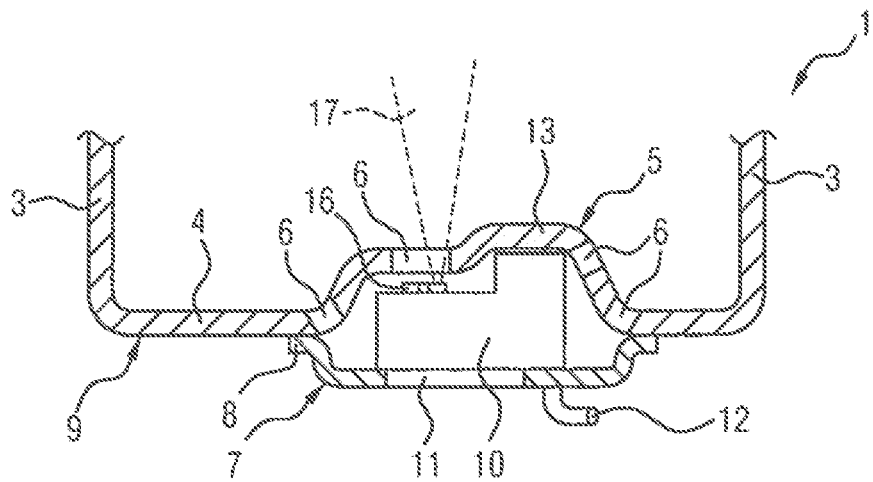
Figure 7:
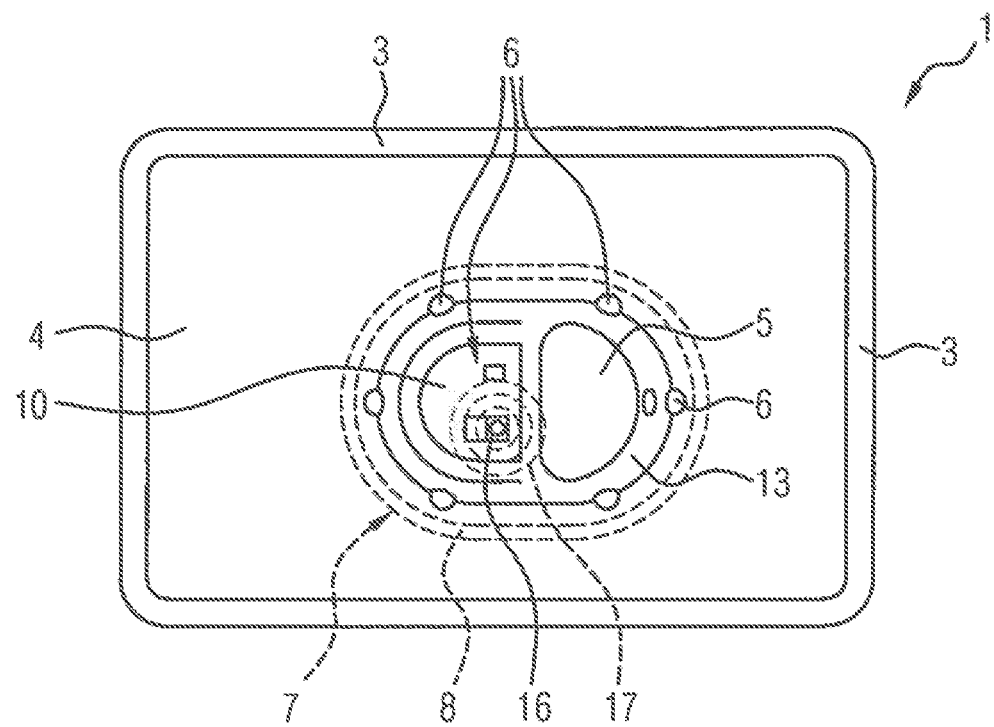

FIGS. 6 and 7 show a modification of the tank system as per the preceding figures, in which a semicircular opening 6 has a cross-sectional area approximately 20 times larger in relation to the other openings 6. A filling level sensor, configured as an ultrasonic sensor 16, is disposed below the opening 6 on the conveying device 7 such that the ultrasonic signal 17 emitted by the ultrasonic sensor 7 and reflected back can pass through the opening 6 without any disturbances in the signal emission and the signal reception by the ultrasonic sensor 16 arising by virtue of the opening 6.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A tank system for a reducing agent, comprising:
a vessel (1) configured to store the reducing agent, the vessel (1) having:
an upper vessel wall (2),
lateral vessel walls (3),
a lower vessel wall (4) configured to form a base of the vessel (1),
a base region (5) of the vessel (1), the base region (5) of the vessel (1) having at least one opening (6), and
an outer side (9) of the vessel (1); and
a conveying device (7), arranged on the outer side (9) of the vessel (1), the conveying device being configured to provide the reducing agent under pressure by way of an outlet to an exhaust gas, wherein:
the conveying device (7) is disposed on the outer side (9) of the vessel (1) such that the conveying device (7), conjointly with the outer side (9) of the vessel (1), forms a space S located outside the vessel (1), the conveying device (7) having a lower flat surface, an upwardly and peripherally extending wall angled with respect to the lower flat surface, and a peripherally arranged flange (8) projecting from an upper edge of the extending wall in a direction parallel with the lower flat surface, and the space S, by way of the at least one opening (6), is connected to an interior of the vessel (1) such that reducing agent located in the vessel (1) can flow from the interior of the vessel (1) into the space S located outside the vessel (1) and, by way of the conveying device (7), is suppliable from the space S to the exhaust gas.

2. The tank system as claimed in claim 1, wherein the flange (8) is connected to the outer side (9) of the vessel (1) to form the space S.

3. The tank system as claimed in claim 2, wherein at least two openings (6) are disposed in the base region (5) of the vessel (1).

4. The tank system as claimed in claim 3, wherein all the openings (6) are of an identical size.

5. The tank system as claimed in claim 3, wherein at least one opening (6) is larger than at least one other opening (6).

6. The tank system as claimed in claim 3, wherein at least one opening (6) has a shape that deviates from a circular shape.

7. The tank system as claimed in claim 1, wherein the base region (5) of the vessel (1) which conjointly with the conveying device (7) forms the space S has a porosity of 98% to 2%.

8. The tank system as claimed in claim 1, wherein the base region (5) of the vessel (1) has at least one inversion (13) directed into the interior of the vessel (1).

9. The tank system as claimed in claim 8, wherein the inversions (13) in relation to the lower vessel wall (4) have dissimilar heights.

10. The tank system as claimed in claim 9, wherein the openings (6) are disposed in a manner distributed non-uniformly in the base region (5) of the vessel (1).

11. The tank system as claimed in claim 10, wherein regions (14) of the conveying device (7) within the space S bear on the outer side (9) of the vessel (1).

12. The tank system as claimed in claim 11, wherein a heating device (15) is provided at least in the regions (14) in which the conveying device (7) within the space S bears on the outer side (9) of the vessel (1).

13. The tank system as claimed in claim 1, wherein the openings (6) are disposed in a manner distributed uniformly in the base region (5) of the vessel (1).

14. The tank system as claimed in claim 1, wherein the base region (5) of the vessel (1) which conjointly with the conveying device (7) forms the space S has a porosity of 80% to 4%.

15. The tank system as claimed in claim 1, wherein the base region (5) of the vessel (1) which conjointly with the conveying device (7) forms the space S has a porosity of 50% to 6%.

* * * * *